Jan. 3, 1950          C. C. STEVENS        2,493,325
METHOD AND APPARATUS FOR OPTICAL PROJECTION
OF RACEWAY CONTOURS AND THE LIKE
Filed July 3, 1944                        2 Sheets-Sheet 1

INVENTOR:
CLARENCE C. STEVENS,
BY Romayn A. Spare
HIS ATTORNEY.

Jan. 3, 1950     C. C. STEVENS     2,493,325
METHOD AND APPARATUS FOR OPTICAL PROJECTION
OF RACEWAY CONTOURS AND THE LIKE
Filed July 3, 1944     2 Sheets-Sheet 2

INVENTOR:
CLARENCE C. STEVENS,
BY Romeyn A. Spare
HIS ATTORNEY.

Patented Jan. 3, 1950

2,493,325

UNITED STATES PATENT OFFICE 2,493,325

METHOD AND APPARATUS FOR OPTICAL PROJECTION OF RACEWAY CONTOURS AND THE LIKE

Clarence C. Stevens, Forestville, Conn., assignor to General Motors Corporation, Detroit, Mich., a corporation of Delaware Application July 3, 1944, Serial No. 543,258

9 Claims. (Cl. 88—24)

This invention relates to inspection of raceway contours and the like and comprises all of the features and aspects of novelty herein disclosed. It has heretofore been proposed to inspect the contour of an article by projecting light across it onto a screen where the contour is magnified for observation. While this can readily be done in the case of an article such as a bearing inner race ring whose raceway to be inspected is on the outside and accessible, an outer race ring whose raceway is on the inside cannot be so inspected because the ring is opaque and the raceway is inaccessible for passage of light across it. According to the present invention, a plastic substance, preferably a soft metal alloy with a low melting point, is inserted within the ring and forcibly pressed against the interior surface which is to be inspected to take an impression thereof. Then the ring and the impression are separated and the impression or replica of the work contour is located in potential registration with a master surface of acceptable contour while a light beam is directed at the mating surfaces to pass through any space existing therebetween to a projecting apparatus for magnification and inspection.

An object of the invention, accordingly is to provide an improved method and apparatus for inspecting contours or surface irregularities, especially those on the interior of an outer race ring of an antifriction bearing. Another object is to provide an improved method and apparatus for inspecting contours or surface conditions on articles wherein the surface to be inspected is not accessible for projecting light across it.

Figure 1:
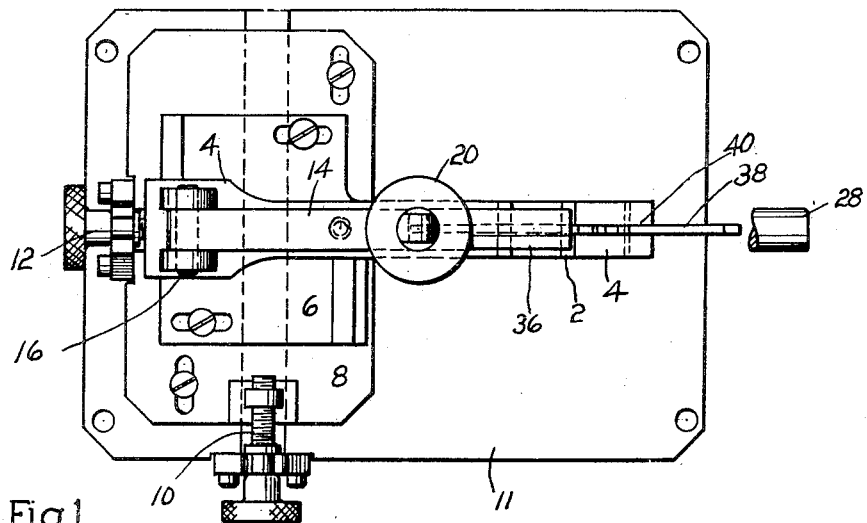
Fig. 1 is a plan view and Fig. 2 is a front view.

The work piece W is herein shown as the outer race ring of a double row ball bearing whose interior grooved raceways G are to be inspected for contour and finish. Although the invention is especially useful for inspecting surfaces on the interior of a bearing ring or the like, it is not limited thereto and is applicable to inspection of contours or surface conditions quite generally. The ring or work piece W is first supported in a channel of a seat plate 2 which is carried in a recess of a bar 4 mounted on a pair of slides 6 and 8. The upper slide 6 is adjustable crosswise of the lower slide 8 by a screw 10. The lower slide is adjusted on a base plate 11 by a screw 12 and the two adjustments are to bring a replica or impression of the selected raceway into focus with a light projecting apparatus.

A movable carrier, herein shown as a lever 14 is pivoted by a removable pin 16 to a pair of lugs welded to the bar 4, the lever being urged towards a slightly tilted position by a light coil spring 18 so that the ring W can readily be placed in its seat where it will encircle the end of the lever. A vertical casing 20 is fastened to the bar 4 and contains a headed plunger 22 urged downwardly by a strong coiled spring 24, a ball 23 being inserted between the head of the plunger and a hardened wear plate on the lever 14. The head of the plunger is formed by a nut 25 threaded thereon to adjust the tension of the spring. The upper end of the plunger projects through the top of the casing where its flattened end is pivoted at 26 to a forked handle 28. The fork has cam surfaces 30 adapted to engage the top of the casing to compress the spring 24 and thereby allow the lever to take its tilted position by the action of the light spring 18.

The end of the lever has an arcuate recess 31 to removably receive a yieldable transfer member, preferably a narrow block of plastic material 32 in the form of a segment fitting the recess and having a projection 34 adapted to be forcibly pressed against one of the raceways to take its impression. The plastic material may be any suitable substance capable of deformation into the shape of the member it is pressed against. One substance found effective is "Cerrobend" an alloy comprising bismuth 50%, cadmium 12.5%, lead 25% and tin 12.5%. This substance melts around 155 to 160° F. so that it can be placed in hot water for melting and recovery. The block 32 is removably held in its recess by a clamping plate 36 fastened by screws to the lever, the lower end of the plate being bevelled. A hole 37 for a knockout pin facilitates removal of the block from the lever.

Figure 2:
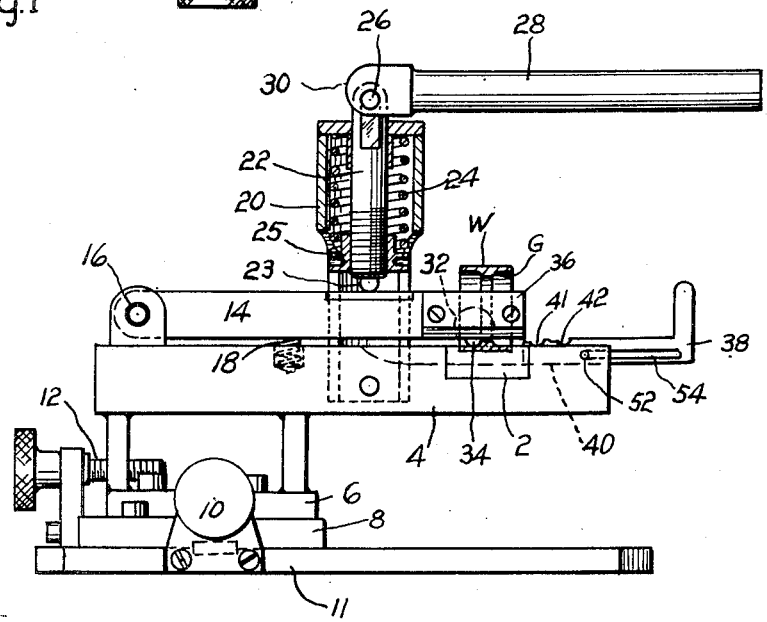
Figure 3:
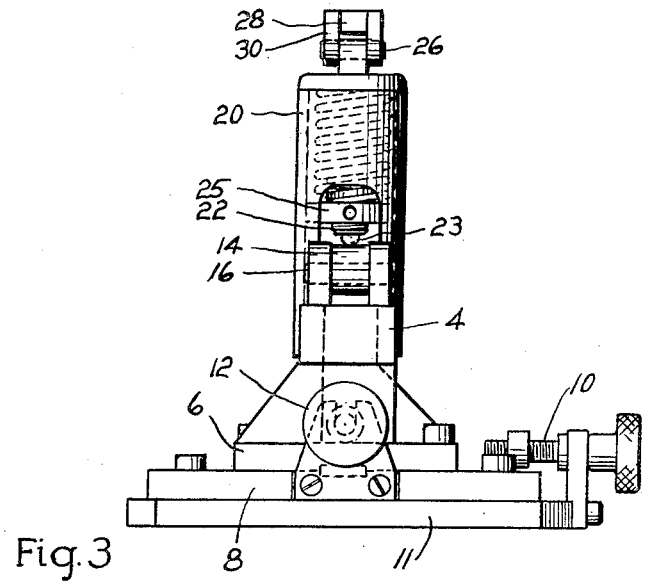
Fig. 3 is an end view and Fig. 4 is a perspective view.
Figures 4, 5:
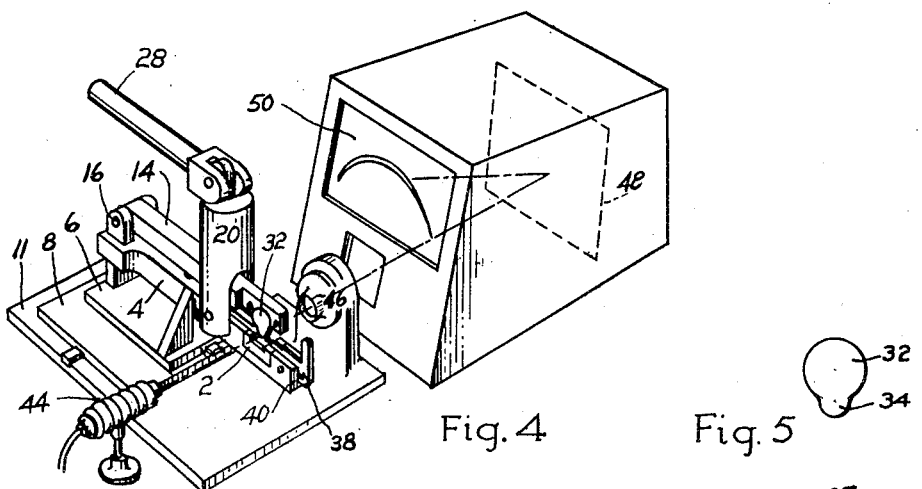
Fig. 5 is a front view of a detail.
Figures 6, 7, 8:
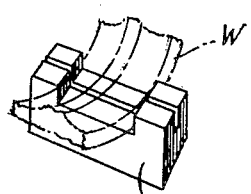
Figs. 6, 7 and 8 are perspective views of details.

To deform the projection 34 against the raceway, the handle 28 is swung to the position shown in Fig. 2 which releases the spring 24 and urges the lever 14 downwardly with a pressure which can always be duplicated. The narrow plastic member moves in a radial plane of the race ring to engage the bottom segment thereof to take a continuous impression of the raceway transversely of the race ring. When the pressure is released by swinging the lever anticlockwise, the lever 14 will tilt upwardly somewhat under the action of spring 18 and the work is removed endwise. The projection 34 then has an impression of the raceway and this replica is then compared with a master or a pair of masters as will appear.

A slide 38 slidably fitting in a groove 40 of the bar 4 and in an aligned groove in the seat plate 2 is then slid inwardly to bring one or the other of its two master grooves 41 and 42 under the projection 34. The projection is then moved down into the selected master groove by manual pressure on the lever 14 and a light beam is projected towards the mating surface to determine how close is the coincidence. The master grooves are laterally unobstructed external surfaces which allow passage of light as distinguished from the interior raceways G which are enclosed by the opaque material of the ring and so are laterally obstructed. Hence light can be projected between the master and the impression if there is lack of conformity at any point. The light comes from a lamp in a casing 44 and, after passing perpendicular to the narrow plastic member and through any space that may exist between the mating surfaces goes through a projecting lens 46 into a casing supporting a mirror 48 which reflects the image in magnified form onto a ground glass screen 50 for observation. The projecting apparatus is not per se a part of my invention.

When the selected raceway has been compared with one of the master grooves 40 or 41, it is then similarly compared with the other master groove, the slide 38 being actuated to bring the desired groove under the impression. One groove is a maximum and the other a minimum, each preferably representing one limit of acceptable contour. The ring is then reversed end for end and the other raceway is then similarly inspected. The slide 38 is located and held from dropping out of the groove 40 by a removable pin 52 which passes through a slot 54 in the slide. When an arcuate raceway is being inspected and its radius is beyond an acceptable limit, the image may appear as a thin lighted crescent or as two spaced lighted areas depending upon whether the maximum or minimum master surface is used. Other raceway shapes or surfaces on other articles than race rings can be inspected by the apparatus and method. Since the lever 14 is removable with the plastic block, the impression can be transported to any selected location where it is desired to have the light projecting apparatus set up for inspection. The removable lever can be mounted on a grinding machine or the like for direct engagement of the plastic material with work prior to its removal from the grinding machine. The apparatus will even detect undesirable grinding marks. The block of plastic material will serve to take many impressions especially when the contours to be inspected are all nearly alike. Even after long repeated use, if the material gets squeezed out of a desirable preliminary shape, it can be removed and melted in hot water and recovered for molding or forming again. The term "plastic" is used in the claims in the sense of a substance or material which lacks elasticity and will yield or undergo plastic deformation at normal temperatures under moderate pressure against a work piece as distinguished from thermoplastic or other materials which are heated or melted for moulding or casting a work piece.

I claim:

1. The method of inspecting the transverse curvature of a raceway in the interior of an outer race ring of an antifriction bearing, comprising the steps of moving the ring endwise to surround a narrow plastic member maintained in a radial plane of the ring, forcing the narrow plastic member and a segment of the raceway into pressure contact along said radial plane of the ring to form a continuous impression of the raceway curvature, removing the ring endwise from surrounding relation to the impression, shifting a master of acceptable curvature into potential registration with the curvature of the impression in said plane, and projecting light perpendicular to said plane and between the adjacent curves to reveal the extent of coincidence.

2. The method of inspecting the transverse curvature of a raceway in the interior of an outer race ring of an antifriction bearing, comprising the steps of forcing into pressure contact a narrow plastic member and a narrow segment of the raceway curvature extending in a radial plane of the ring to form an impression of the raceway surface in said radial plane only, bringing the impression and a master surface of acceptable curvature into potential coincidence, and projecting light between the adjacent surfaces to reveal the extent of their conformity along the curve.

3. The method of inspecting the transverse curvature of a raceway in the interior of an outer race ring of an antifriction bearing, comprising the steps of moving the ring endwise to surround a narrow plastic member maintained in a radial plane of the ring, forcing the narrow plastic member and a segment of the raceway into pressure contact along said radial plane of the ring to form a continuous impression of the raceway curvature, removing the ring endwise from surrounding relation to the impression, and projecting light perpendicular to said plane and across the impression for observation.

4. In apparatus for inspecting the transverse curvature of a raceway in the interior of an outer race ring of an antifriction bearing, a support for the ring, a lever having a plastic member near its free end, the lever having a pivotal mounting on the support to provide for placing the ring in surrounding relation to the plastic member, means reacting on the lever to press the plastic member towards the support and radially against a segment of the raceway to take an impression of the curvature, a master mounted on the support and having an acceptable contour movable into potential registration with the impression when the work is removed from the support, and means mounted in fixed relation to the support for revealing the extent of conformity of the curves while the impression and the master remain on the support.

5. In apparatus for inspecting the transverse curvature of a raceway in the interior of an outer race ring of an antifriction bearing, a support for the ring, a narrow plastic member within the ring and movable in a radial plane thereof, means for forcing the plastic member against a segment of the raceway in said radial plane to take a continuous impression of the raceway curvature, a master shiftably mounted on the support to bring a master surface of acceptable contour into potential registration with the impression when the ring is removed from the support, and means for revealing the extent of conformity of the curvatures while the master and the impression remain in contact on the support.

6. In apparatus for inspecting the transverse curvature of a raceway in the interior of an outer race ring of an antifriction bearing, a support for the ring, a narrow plastic member within the ring and movable in a radial plane thereof, means for forcing the plastic member radially against a segment of the raceway to take a continuous impression of the raceway curvature, a master having an acceptable raceway curvature, and means for holding the master and the impression in potential coincidence to determine the extent of conformity of the curvatures.

7. In apparatus of the character indicated, a support for a hollow work piece, a narrow plastic member adapted to occupy the interior of the piece, means for forcing the plastic member and a segment of an interior surface of the piece into pressure contact to take an impression, a master having maximum and minimum acceptable contours, and means for sliding the master along the support to bring either of its contours into potential registration with the impression.

8. In apparatus of the character indicated, a support for a hollow work piece, a pivoted lever, a plastic member mounted on the lever and adapted to occupy the interior of the piece, means for forcing the plastic member against an interior surface of the piece to take an impression of its contour, a master having an acceptable contour, means for sliding the master into potential registration with the impression when the work piece is removed from the support, and a spring acting to lift the lever to facilitate removal of the work piece.

9. In apparatus for inspecting the contour of a raceway on the interior of a bearing race ring, a support for the race ring, a carrier adapted to be encircles by the race ring, a plastic member mounted on the carrier adjacent to the raceway, means for relatively moving the carrier and the race ring to cause the plastic member to forcibly engage the raceway to take an impression thereof, a master having an external laterally unobstructed surface representing an acceptable raceway contour, means for relatively moving the master and the impression to bring them into potential registration, and means for directing a beam of light between the master and the impression to reveal any lack of conformance between them.

CLARENCE C. STEVENS.

REFERENCES CITED

The following references are of record in the file of this patent:

UNITED STATES PATENTS

| Number | Name | Date |
| --- | --- | --- |
| 781,960 | Marbach | Feb. 7, 1905 |
| 1,255,127 | Baukat | Feb. 5, 1918 |
| 1,319,361 | Rowanet | Oct. 21, 1919 |
| 1,489,575 | Hanson | Apr. 8, 1924 |
| 1,547,514 | Mueller | July 28, 1925 |
| 1,589,349 | Bausch et al. | June 22, 1926 |
| 1,665,721 | Stockton | Apr. 10, 1928 |
| 1,732,730 | Porter et al. | Oct. 22, 1929 |
| 1,789,009 | Luce | Jan. 13, 1931 |
| 2,097,850 | Wallace | Nov. 2, 1937 |
| 2,271,454 | Erdle et al. | Jan. 27, 1942 |
| 2,314,838 | Kingston | Mar. 23, 1943 |
| 2,405,245 | Ushakoff | Aug. 6, 1946 |